Nov. 7, 1961 J. C. BROTTON 3,007,422
VEHICLE CARGO TIE-DOWN ANCHORING DEVICE
Filed March 31, 1958 2 Sheets-Sheet 1

INVENTOR.
JOHN C. BROTTON
BY
William Cleland
ATTORNEY

Nov. 7, 1961   J. C. BROTTON   3,007,422
VEHICLE CARGO TIE-DOWN ANCHORING DEVICE
Filed March 31, 1958   2 Sheets-Sheet 2

INVENTOR.
JOHN C. BROTTON
BY
William Cleland
ATTORNEY

United States Patent Office 3,007,422
Patented Nov. 7, 1961

3,007,422
VEHICLE CARGO TIE-DOWN
ANCHORING DEVICE
John C. Brotton, 307 E. Park Blvd., Akron 5, Ohio
Filed Mar. 31, 1958, Ser. No. 725,411
3 Claims. (Cl. 105—369)

This invention relates to a cargo tie-down anchor, and particularly relates to a tie-down anchor for use on the floors or other walls of vehicle bodies.

One object of the present invention is to provide a tie-down anchor of the character described, which is simple in construction and easy to install in either new or existing vehicle bodies, and which is provided with normally concealed extensible anchoring means adapted to be quickly extended, as for attachment of a cargo tie-down chain thereto.

Another object of the invention is to provide a cargo tie-down anchor which in a retracted condition thereof in a vehicle body will have no protruding or otherwise exposed parts which would be likely to trip persons walking on the floor of the vehicle body, for example.

Still another object of the invention is to provide a tie-down anchor of the character described, wherein flexible restraining elements are adapted to be extended through an opening in a floor or wall of a vehicle body, and wherein is provided improved closure means adapted to be flush with the floor or wall surface when the device is not in use as an anchor, and wherein the closure means is provided with a simple device which facilitates manual grasping of the same for extension of the flexible element for anchoring purposes.

Other objects of the invention will be manifest from the following brief description and the accompanying drawings.

Figure 1:
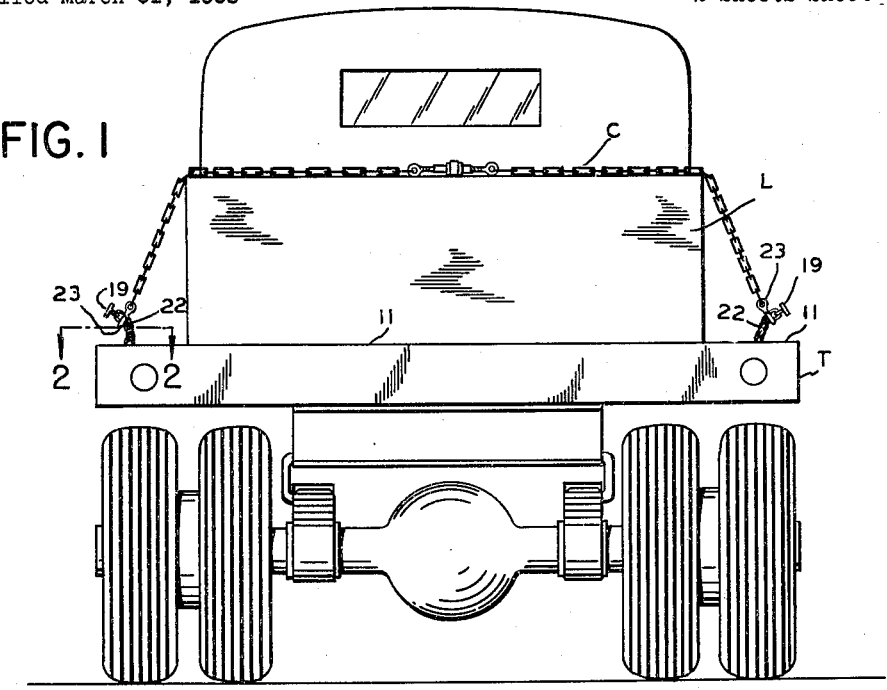
FIGURE 1 is a rear view of a truck, illustrating the use of the improved cargo tie-down anchoring means for anchoring the ends of a chain binder which is engaged about a load on the truck.

Referring to the drawings generally, there is illustrated an anchoring unit 10, embodying the features of the invention, mounted in a floor or bottom wall 11 of a truck T. As best shown in FIGURE 1, any desired number of units 10 may be provided but generally will be arranged in oppositely disposed pairs of the same, for anchoring opposite ends of the chain binder C of known type used for holding down a load L.

Figure 3:
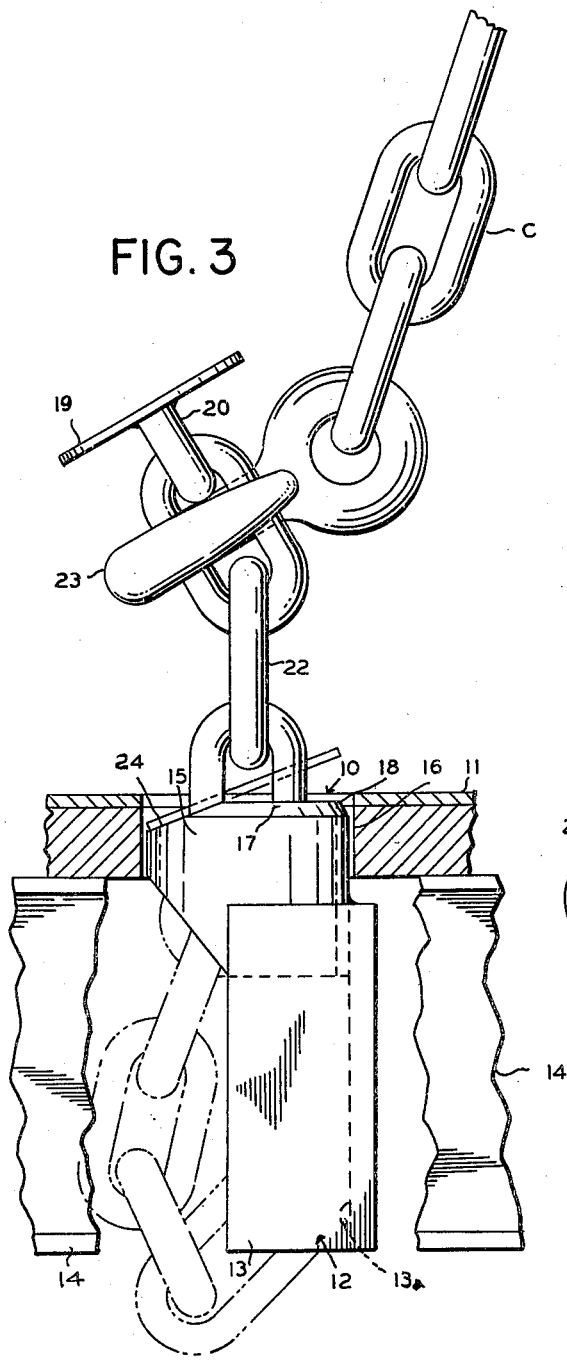
FIGURE 3 is a vertical cross section, taken substantially on the line 3—3 of FIGURE 2 and on the same scale, illustrating the anchoring unit in an extended position of use corresponding to that shown in FIGURE 1.
Figure 4:
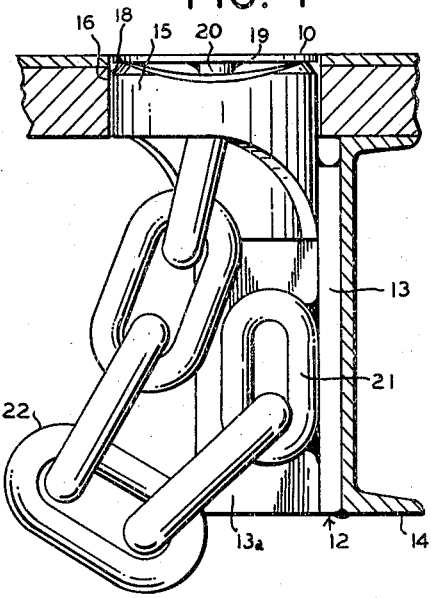
FIGURE 4 is a vertical cross section, taken substantially on the line 4—4 of FIGURE 2, and on the same scale, illustrating the anchoring unit in the inoperative condition thereof.

Each anchoring unit 10 may include a supporting member 12, in the form of a rigid angle bar, having one flange 13 thereof welded or otherwise affixed to a cross-member 14 of the truck to extend vertically at a point beneath the surface of floor or wall 11. Affixed to the upper end of the member 12, between the inner faces of the flanges 13 and 13a thereof, may be a metal sleeve or collar 15 which extends through a circular hole 16 through the floor 11. The upper end of the sleeve 15 is beveled at 17, as shown in FIGURES 3 and 4, to present a narrow peripheral edge or seat 18, slightly inwardly spaced from the plane of the upper surface of floor 11. A thin closure plate or cap 19 is adapted to be supported flatly upon seat 16 with the outer face of the disc flush with said floor surface. Loosely connected between a metal loop 20, affixed to the underside of disc 19, and a metal anchoring link 21 affixed to the lower portion of member 13, at the inner juncture of the flanges 13 and 13a thereof, may be a flexible restraining element in the form of a metal link chain 22. This arrangement is such that chain 22 may be extended to present several links of the same through floor opening 16, as for anchoring attachment of a hook 23 of the chain binder C.

Figure 2:
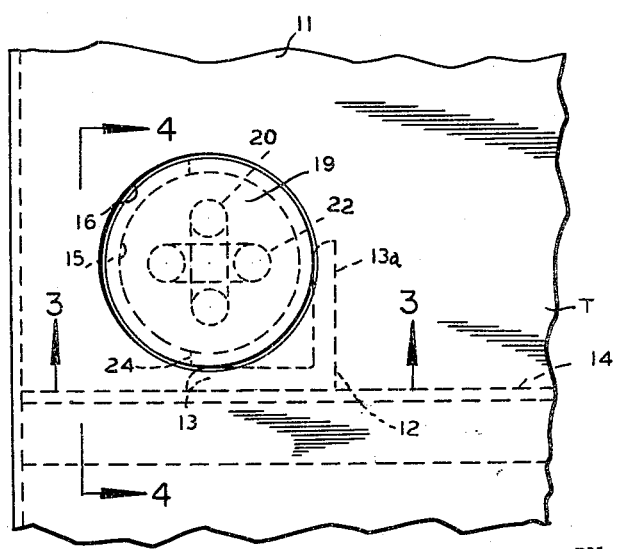
FIGURE 2 is an enlarged fragmentary plan view, taken substantially on the line 2—2 of FIGURE 1, and illustrating one of the anchor units in an inoperative condition.

To facilitate lifting the chain or element 22 through the opening 16, less than half the upper edge of the sleeve 15 may be chamfered in a plane at an acute angle to the plane of the seat portion 18, whereby manual downward pressure on the edge of the plate 19 over the chamfered portion will tilt the opposite edge of the plate upwardly, from the position of the plate shown in full lines in FIGURES 2 and 4 to the position shown in chain-dotted lines in FIGURE 3. Thus, the upwardly exposed edge of the plate 19 may be manually grasped to lift the element 22 to its fully extended length, as best shown in FIGURE 3.

Referring to FIGURE 4, it will be seen that the link chain is in the form of a loop between closure cap 19 and anchoring link 21, and that the closure cap will be self-operating toward closed position by the tendency of the chain to retract to said looped condition by its own weight. As the lower end of the chain is anchored at a point beneath the collar, only a single extent of chain extends through the relatively small collar opening in all positions of the chain (see full lines in FIGURES 3 and 4). Accordingly, the cap 19 serves as a means for facilitating manual extension of the chain, a closure for the collar opening, and as a stop for limiting inward retraction of the chain.

The units 10 are provided as oppositely disposed "rights" and "lefts," so that they may be selectively positioned to have the chamfered portion 24 of the sleeve 15 closely adjacent a side wall or side edge of the truck body. This is desirable to reduce to a minimum the chance of someone stepping on the plate at the edge which is over the chamfer on the sleeve.

In use of the improved anchoring unit 10, it is normally in retracted condition, as shown in FIGURES 2 and 4, in which the disc 19 is held seated on the upper rim or seat 18 of the sleeve 15 by the weight of the chain 22 loosely supported between the disc 19 and supporting member 12 (see FIGURE 4). When it is desired to anchor a corresponding end of chain binder C, the operator presses the disc 19 downwardly into the chamfered position 24 of sleeve 15. This tilts the disc as shown in chain-dotted lines in FIGURE 3 to permit manual grasping of the protruding edge of the disc to lift the chain 22 upwardly to exposed position for ready attachment of the chain binder hook 23 (see full lines in FIGURES 1 and 3). Conversely, the chain binder hook 23 may be released to permit downward retraction of the flexible element 22, by its own weight, until the closure disc 19 is flatly seated on the peripheral seat 18 of the sleeve, as best shown in full lines in FIGURES 2 and 4.

Modifications of the invention may be resorted to without departing from the spirit thereof or the scope of the appended claims.

What is claimed is:

1. A cargo tie-down anchor as for incorporation in the floor of a vehicle or the like having a supporting structure, comprising a collar providing an opening therethrough and having a downward anchoring extension, means for attaching said collar to the floor supporting structure to have the upper end of the collar adjacent the floor surface, a link chain having a lower end thereof anchored to said anchoring extension, and a closure cap on an upper end of said chain for closing the upper end of the collar opening, said cap being self-operating toward closed position by the weight of the chain upon release of the same toward a retracted condition in which the chain is looped between the cap and the anchored lower end of the chain, said anchored lower end of said chain being below said collar whereby the double portion of the looped chain is spaced downwardly of said collar and whereby only a single extent of chain extends through the collar opening in all extended or retracted positions of the chain, said chain being extensible upwardly through said collar opening by manually gripping said cap for use of the extended chain for load anchoring purposes.

2. A cargo tie-down anchor as for incorporation in the floor of a vehicle or the like having a supporting structure, comprising a collar providing an opening therethrough and having a downward anchoring extension, means for attaching said collar to the floor supporting structure to have the upper end of the collar adjacent the floor surface, a link chain having a lower end thereof anchored to said anchoring extension, and a closure cap on an upper end of said chain for closing the upper end of the collar opening, said cap being self-operating toward closed position by the weight of the chain upon release of the same toward a retracted condition in which the chain is looped between the cap and the anchored lower end of the chain, said anchored lower end of said chain being below said collar whereby the double portion of the looped chain is spaced downwardly of said collar and whereby only a single extent of chain extends through the collar opening in all extended or retracted positions of the chain, said chain being extensible upwardly through said collar opening by manually gripping said cap for use of the extended chain for load anchoring purposes, the upper end of said collar having a chamfered portion whereby manual downward pressure on the edge of said cap over said chamfered portion will tilt the cap upwardly to facilitate manual grasping of said cap.

3. A cargo tie-down anchor as for incorporation in the floor of a vehicle or the like having a supporting structure, comprising a member having an opening extending inwardly from an upper end thereof, means for attaching said member to the floor supporting structure to have said upper end adjacent the floor surface, a link chain having a lower end thereof anchored to said member, and a closure cap on an upper end of said chain for closing the upper end of the member, said cap being self-operating toward closed position by the weight of the chain upon release of the same toward a retracted condition in which the chain is looped between the cap and the anchored lower end of the chain, said chain being extensible upwardly of said upper end of the member by manually gripping said cap for use of the extended chain for load anchoring purposes, the upper end of said member having a chamfered portion permitting engagement of said cap at an edge thereof to tilt the cap and facilitate manual grasping of the cap.

References Cited in the file of this patent

UNITED STATES PATENTS

| | | |
|---|---|---|
| 544,462 | Crocker | Aug. 13, 1895 |
| 1,723,799 | McDougall | Aug. 6, 1929 |
| 1,739,829 | Fedderman | Dec. 17, 1929 |
| 2,026,463 | Driess | Dec. 31, 1935 |
| 2,078,052 | Butterworth | Apr. 20, 1937 |
| 2,087,067 | Nampa | July 13, 1937 |
| 2,138,061 | Friedinger | Nov. 29, 1938 |
| 2,757,039 | Merriman | July 31, 1956 |